(12) United States Patent
Ishitobi et al.

(10) Patent No.: US 6,229,777 B1
(45) Date of Patent: May 8, 2001

(54) INFORMATION RECORDING MEDIUM, APPARATUS AND CONTROL METHOD THEREFOR

(75) Inventors: Tatsuya Ishitobi, Kawasaki; Hiroaki Ono, Fujisawa; Tamotsu Ito, Ayase; Shigemitsu Higuchi, Fijisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/227,966

(22) Filed: Jan. 11, 1999

(30) Foreign Application Priority Data

Jan. 12, 1998 (JP) .................................................. 10-003777

(51) Int. Cl.$^7$ ........................................................ G11B 3/90
(52) U.S. Cl. ............................................. 369/53.2; 369/32
(58) Field of Search .................................. 369/30, 32, 33, 369/44.28, 47.13, 53.2, 53.24, 53.37, 53.45; 360/13

(56) References Cited

U.S. PATENT DOCUMENTS

| | | | |
|---|---|---|---|
| 5,920,535 | * | 7/1999 | Hisamatsu et al. ................ 369/32 X |
| 5,995,471 | * | 11/1999 | Saoyama et al. .................. 369/84 X |
| 6,052,346 | * | 4/2000 | Arataki et al. ..................... 369/32 X |

* cited by examiner

*Primary Examiner*—Paul W. Huber
(74) *Attorney, Agent, or Firm*—Antonelli, Terry, Stout & Kraus, LLP

(57) ABSTRACT

An information recording and control method and apparatus for a recording medium disc having information previously recorded thereon. New information is overwritten at least a portion of the previously recorded information in a recording area of the recording medium disc. Information on the new information is cataloged as control information on the recording medium disc. Residual information which is part of the previously recorded information which is not overwritten by the new information is treated as new information and information on the residual information which is treated as new information is cataloged as control information on the recording medium disc.

19 Claims, 7 Drawing Sheets

INFORMATION RECORDING MEDIUM, APPARATUS AND CONTROL METHOD THEREFOR

TECHNICAL FIELD

The present invention relates to a method and apparatus to record and control information in an information recording medium having a shape like a disc and, more particularly, to an optical recording medium such as a magneto-optical recording medium for a disc camcorder or the like.

BACKGROUND OF THE INVENTION

A computer system serving as a host apparatus of a disc information recording/reproducing apparatus with a disc used as a recording medium thereof is known. With a method to record and control information in a disc employed in such a computer system, in order to record new information into a recording area on the disc in which information has already been recorded, the existing information is deleted to secure an area for recording the new information. That. is, the conventional method to record and control information does not embrace a concept to overwrite new information on existing information. In an operation to record new information, the information recording/reproducing apparatus moves a recording/reproducing head to an empty area on the disc with no information recorded therein to record the new information thereon even if the head is already on an area with information already recorded therein as long as no operation is carried out to delete the recorded information. When new information is recorded on a portion of an area with information already recorded therein, an empty area for recording the new information is created by, first of all, reading out the recorded information by a computer. Then, part of the information read out by the computer is deleted in an edit operation before recording the information including the new information again. As an alternative, the new information is recorded in a new area. Since there is no concept to overwrite new information on existing information, in order to rewrite a part of the recorded information, first of all, the recorded information is read out by the computer. Then, the part of the recorded information is replaced by the new information before again recording the information including the new information.

In addition, in the conventional method to record and control information whereby information is recorded and deleted repeatedly, empty areas available for recording new information are scattered throughout the disc. In an operation to record information onto such a disc, information is recorded into a plurality of empty areas in case the information can not be accommodated only in one empty area. As a result, the information recording/reproducing apparatus has to move the recording/reproducing head to target empty areas a number of times, lowering the recording speed. Such movement of the recording/reproducing head is needed not only during a recording operation but also during a reproducing operation as well. Thus, much like the recording speed, the reproducing speed is lowered too. Moreover, when receiving of scene information in playback of recorded information, the problem of intermittent head movement is disruptive and uncomfortable for the viewer.

SUMMARY OF THE INVENTION

It is an object of the present invention to provide a recording medium in the shape of a disc, an information recording/reproducing apparatus and method using the disc recording medium which enables new information to be overwritten into an area on the disc recording medium with information already recorded therein to implement addition of new information and replacement of, part of the recorded information with new information so that the new information is continuously recorded along a track without carrying out. operations to delete, edit and relocate the information already recorded on the disc recording medium.

It is another object of the present invention to record and reproduce information to and from the disc recording medium without moving the recording/reproducing head mounted on the information recording/reproducing apparatus over a long distance and at a high speed in a seek operation.

According to one aspect of the present invention, 'there is provided an information recording and control method and apparatus for controlling information recorded on a disc recording medium whereby:

new information can be overwritten into a recording area on the disc recording medium with information already recorded therein;

information on the overwritten new information is cataloged in control information recorded on the same disc recording medium as the new information;

residual information, that is, part of the recorded information that is not overwritten by the new information, is treated as new information; and information on the residual information is cataloged in the control information.

In addition, according to another aspect of the present invention, there is also provided an information recording and control method and apparatus whereby newly overwritten information is linked to the residual information, that is, part of the recorded information that is not overwritten by the new information, to form new information and information on the new information is cataloged in control information recorded on the same disc recording medium as the new information.

The information recording and control method and apparatus is adopted in a system employing an information recording/reproducing apparatus using a disc as a recording medium thereof and, in particular, an optical disc.

These and other objects, features and advantages of the present invention will become more apparent from the following description when taken in conjunction with the accompanying drawings.

DETAILED DESCRIPTION OF THE PREFERRED EMBODIMENTS

Figure 1:
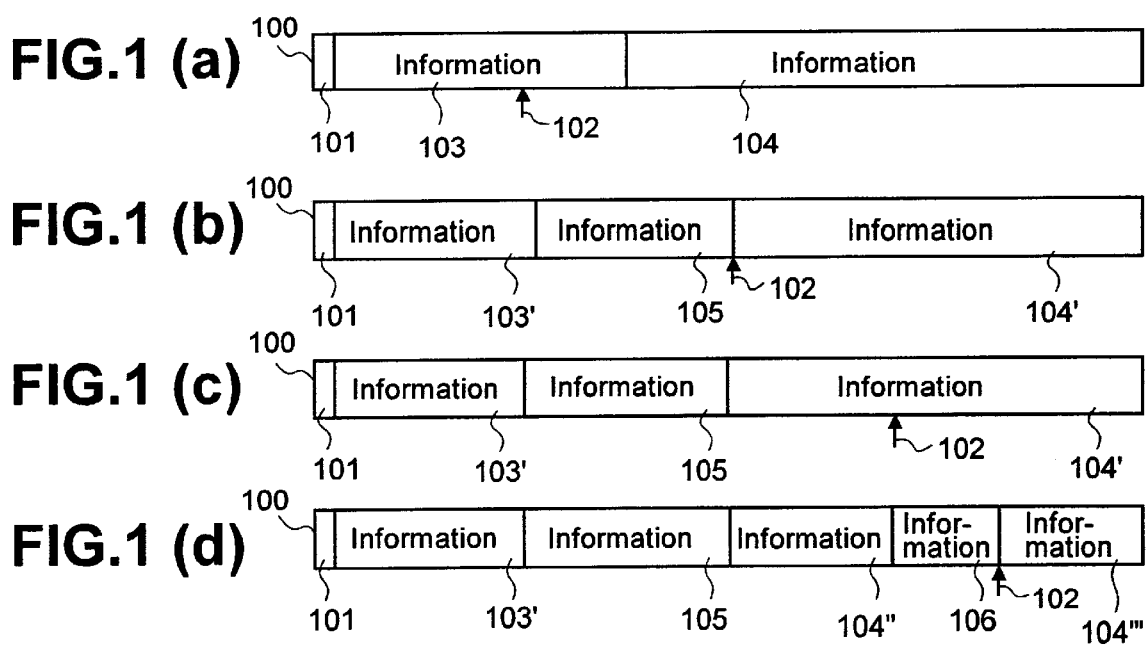
FIGS. 1(*a*)–1(*d*) are diagrams showing a recording state of information recorded by using an information recording/reproducing method in accordance with the present invention.

FIGS. 1(a)–1(d) are diagrams showing the information recording and control method provided by the present invention. In the figures, reference numeral 100 denotes a band-like model representing a recording area on a recording medium employed in an information recording/reproducing apparatus using a disc as a recording medium thereof. FIGS. 1(a), (b), (c) and (d) each show a recording state of a recording area. The left end of the recording area 100 corresponds to a start address. As the position on the recording area 100 moves to the right, the address increases. The right end of the recording area 100 corresponds to an end address. Also, in the figures, reference numeral 101 denotes control information recorded in the recording area 100. The control information 101 includes the names of various kinds of information, their recording locations, sizes, attributes and recording dates, for example. Reference numeral 102 denotes a pointer pointing to a recording or reproducing address in the recording area 100.

FIG. 1(a) is a diagram showing a state of information recording over the entire region of the recording area 100. As shown in the figure, the recorded information includes the control information 101, information 103 and information 104. The control information 101 shown in FIG. 1(a) includes information concerning the information 103 and 104. The pointer 102 is set by an operation of reproducing the information 103 to point to an address in an area for recording the information 103. The following is an explanation of operations to record new information 105 by using the information recording and control method in accordance with the present invention in the state of the recording area 100 shown in FIG. 1(a) so as to result in a state shown in FIG. 1(b).

By using the information recording and control method of the present invention, the information 105 is recorded starting at an address pointed to by the pointer 102 in the state shown in FIG. 1(a) to overwrite part of the information 103 and the information 104. Then, information on the information 105 is added to the control information 101. In addition, since the recording of the information 105 reduces the amount of the information 103 and the information 104, such reduced and retained residual information is indicated in FIG. 1(b) as information 103' and information 104', with information on recording locations and sizes for the information 103' and 104' in the control information 101 being updated. The operations described above result in a state of the recording area 100 shown in FIG. 1(b).

In addition, according to another aspect of the present invention, there is also provided an information recording and control method whereby the information 103', the information 104' and the information 105 in the recording area 100 with a state shown in FIG. 1(b) is cataloged in the control information 101 as a single piece of information.

The following is an explanation of operations to record new information 106 by using the information recording and control method provided by the present invention in the state of the recording area 100 shown in FIG. 1(c) to result in a state shown in FIG. 1(d). In the state shown in FIG. 1(c), the pointer 102 is set by an operation of reproducing the information 104' to point to an address in an area for recording the information 104'.

By using the information recording and control method of the present invention, the information 106 is recorded starting at an address pointed to by the pointer 102 in the state shown in FIG. 1(c). Then, information on the information 106 is added to the control information 101. In addition, since the recording of the information 106 reduces the amount of the retained residual information 104' which is now indicated as information 104", information on the recording location and the size for the information 104" in the control information 101 is updated. Further, a later portion of the residual information 104' separated from the early part thereof by the newly recorded information 106 is cataloged in the control information 101 as information 104'''. The operations described above result in a state of the recording area 100 shown in FIG. 1(d).

In addition, according to the another aspect of the present invention, there is also provided an information recording and control method whereby the information 104", the information 106 and the information 104''' in the recording area 100 with a state shown in FIG. 1(d) is cataloged in the control information 101 as a single piece of information.

The following is an explanation of operations to record new information 105 by using the conventional information recording and control method in the state of the recording area 100 shown in FIG. 1(a) to result in a state shown in FIG. 1(b).

With the conventional information recording and control method, new information can not be recorded in an area unless no information has been recorded in the area or if information has actually been recorded in the area, the information on the information recorded in the area has been deleted from a catalog in the control area. Thus, in the conventional information recording and control method, it is necessary to allocate an area for recording the information 105 prior to an operation to actually record the information 105. In order to allocate such an area, the information 103 is once read out by the host or CPU of the information recording/reproducing apparatus and part of the information 103 is deleted in an edit operation carried out by the host or CPU. Then, the edited information 103' is recorded in the recording area 100 with the deleted portion of the information 103 representing an unrecorded area. These operations result in a state shown in FIG. 3(a).

Figure 3:
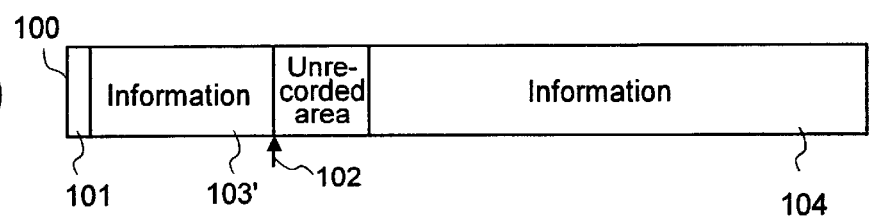
FIGS. 3(*a*)–3(*c*) are diagrams showing a recording state of information recorded by using the conventional information recording/reproducing method.
Figure 3:
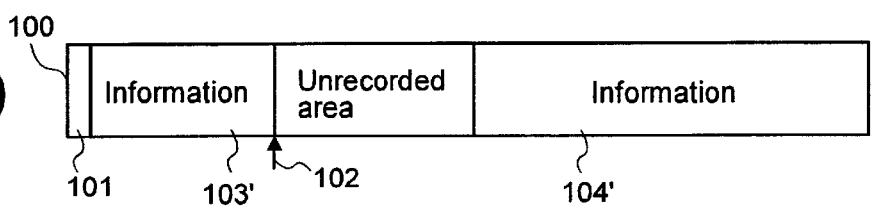
Figure 3:
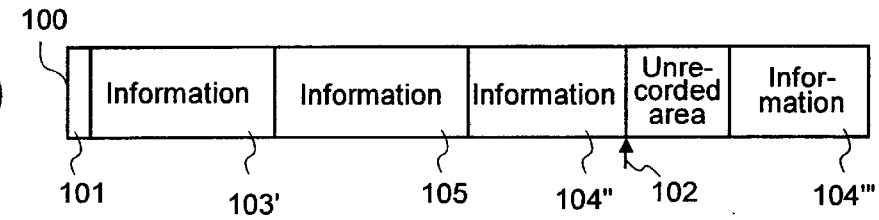

Subsequently, the information 104 of FIG. 3(a) is once read out by the host or CPU of the information recording/reproducing apparatus and part of the information 104 is deleted in an edit operation carried out by the host or CPU. Then, the edited information 104' is recorded in the recording area 100 resulting in a contiguous unrecorded area represented by deleted areas 103 and 104. These operations result in a state shown in FIG. 3(b).

The operations described above make it now possible to record the information 105. By recording the information 105 in the recording area 100 with a state shown in FIG. 3(b), a recording area 100 with a state shown in FIG. 1(b) is obtained.

In addition, in order to record the information 104' and the information 105 in the recording area 100 shown in FIG. 1(b) as a single piece of information by using the conventional information recording and control method, it is necessary to fetch the information 103' and the information 104' by the host apparatus or CPU, link the information 103' to the information 104' in the host apparatus or CPU, replace part of the linked information 103' and the information 104' with the information 105 and finally record the result of the linking and the replacement in the recording area 100.

The following is an explanation of operations to record new information 106 by using the conventional information recording and control method in the state of the recording area 100 shown in FIG. 1(c) to result in a state shown in FIG. 1(d).

In the conventional information recording and control method, it is necessary to allocate an area for recording the information 106 prior to an operation to actually record the information 106. In order to allocate such an area, the information 104' of FIG. 1(c) is once read out by the host or CPU of the information recording/reproducing apparatus. New information 104" and information 104'" are then generated from the information 104' by an edit operation carried out by the host apparatus or CPU. Finally, the generated new information 104" and the generated information 104' are recorded in the recording area 100 with an I!5 unrecorded area between such information. A result of these operations is shown in FIG. 3(c).

The operations described above make it now possible to record the information 106 in the unrecorded area. By recording the information 106 in the unrecorded area of the recording area 100 with a state shown in FIG. 3(c), a recording area 100 with a state shown in FIG. 1(d) is obtained.

In addition, in order to record the information 103', the information 104", the information 106 and the information 104'" in the recording area 100 shown in FIG. 1(d) as a single piece of information by using the conventional information recording and control method, it is necessary to fetch the information 104' by the host apparatus or CPU, replace part of the information 104' with the information 106 and finally record the result of the replacement in the recording area 100.

As described above, unlike the conventional information recording and control method, with the information recording and control method of the present invention, it is not necessary to edit information already recorded in a recording area. As a result, new information can be added at a high speed without letting the host or CPU of the information recording/reproducing apparatus bear an additional load.

Figure 2:
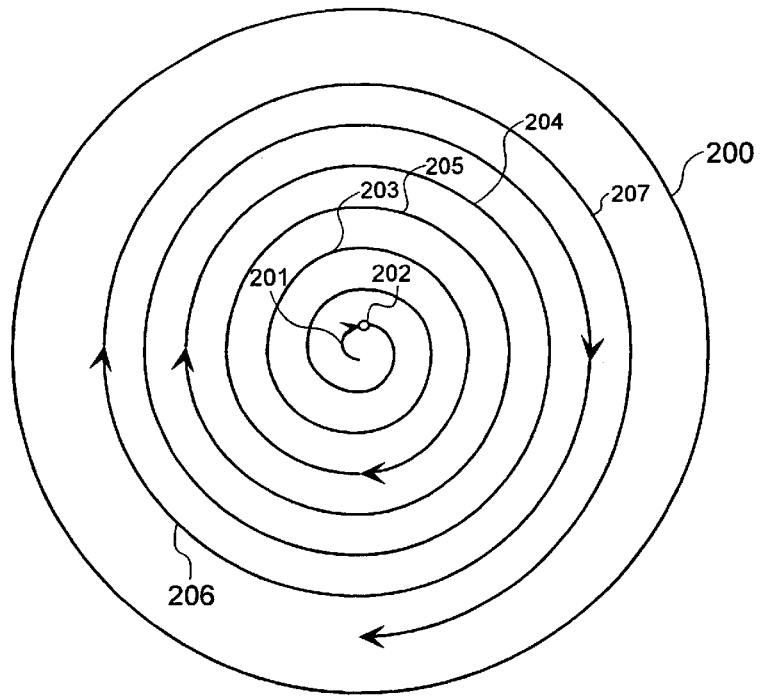
FIG. 2 shows a recording state of information recorded on a recording area on a disc recording medium in accordance with information recording/reproducing method of the present invention.

FIG. 2 is a diagram illustrating the state of the recording area 100 of FIG. 1(d) created by using the information recording and control method of the present invention in a form of a recording area on a recording medium in the shape of a disc 200 which may be an optical recording medium. As shown in the figure, the shape of the recording area on the disc resembles a spiral track. The edge of the spiral-like shape of the recording area on the innermost circumference is a start address while the edge on the outermost circumference is the last address.

Reference numeral 201 shown in FIG. 2 corresponds to reference numeral 101 of FIGS. 1(a)–1(d) which denotes the control information. A circle (o) 202 shown in FIG. 2 represents a recording/reproducing head for recording and reproducing information into and from the disc recording medium 200. The recording/reproducing head 202 is mounted on the information recording/reproducing apparatus employing the disc 200 as a recording medium thereof. The position of the recording/reproducing head 202 corresponds to the address pointed to by the pointer 102 shown in FIG. 1.

In FIG. 2, reference numerals 203', 205, 204", 206 and 204'" each denote information recorded in the recording area, corresponding respectively to reference numerals 103', 105, 104", 106 and 104'" shown in FIG. 1(d).

As shown in FIG. 2, the information recording/reproducing method provided by the present invention always records each piece of information in a contiguous recording area. Thus, by merely driving the recording/reproducing head 202 to follow the recording area of the spiral track, information can be recorded onto the recording area. By the same token, by merely driving the recording/reproducing head to follow the recording area of the spiral track, information can be reproduced from the recording area.

Figure 4:
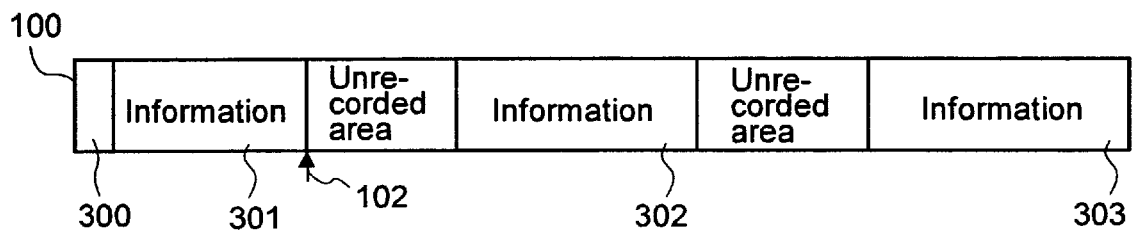
FIG. 4 is a diagram showing a recording state of information recorded by using the conventional information recording/reproducing method.

It should be noted that, while the recording state shown in FIG. 2 can be created also by using the conventional information recording/reproducing method, it is necessary to execute the cumbersome editing operation described above. Further, in the conventional method to record and control information whereby information is recorded and deleted repeatedly, a plurality of empty areas available for recording new information may be scattered throughout the disc recording medium as shown in FIG. 4, so that one piece of information is not recorded in a single contiguous recording area. That is, FIG. 4 is a diagram showing a state in which information elements 301, 302 and 303 originally pertaining to one piece of information are distributed among recording regions in the recording area 100 with unrecorded areas therebetween. Accordingly, contiguous recording of the one piece of information is not obtained.

Figure 5:
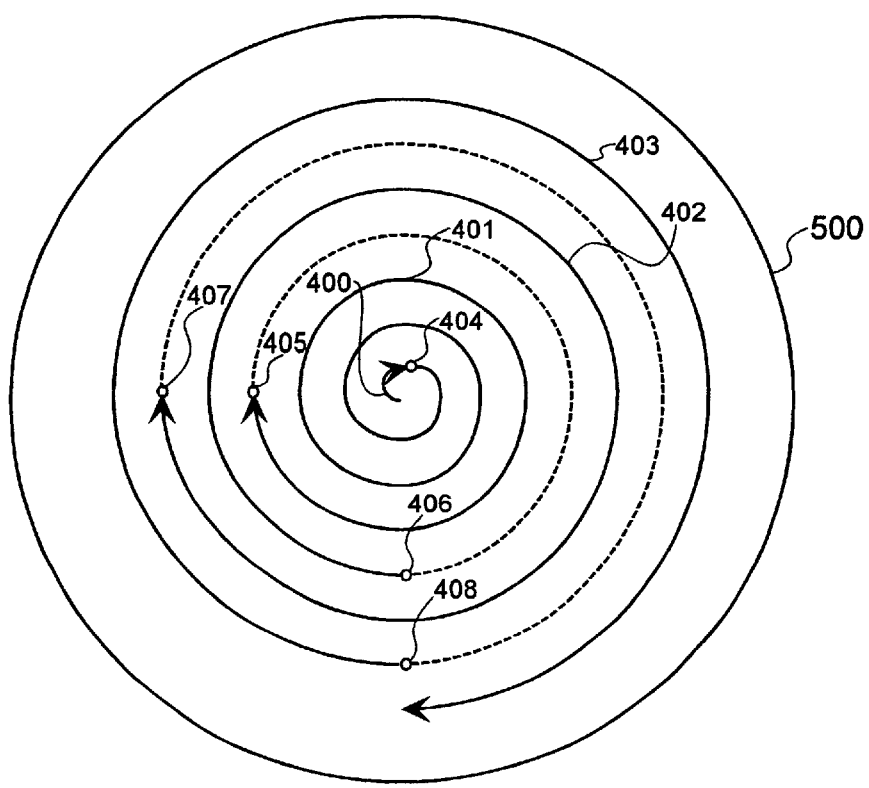
FIG. 5 shows a recording state of information recorded on a recording area on a disc recording medium by using the conventional information recording/reproducing method.

FIG. 5 is a diagram illustrating the state of the recording area 100 of FIG. 4 in a form of a recording area on a disc recording medium 500. Solid lines 401, 402 and 403 shown in FIG. 5 represent pieces of information corresponding respectively to the pieces of information 301, 302 and 303 shown in FIG. 4. In order to record the pieces of information 401, 402 and 403, a recording/reproducing head represented by a circle (o) is moved forward from a position 404 to a position 405 shown in FIG. 5 in a direction toward the outermost circumference to first record the information 401. Then, the recording/reproducing head jumps from the position 405 to a position 406 shown in FIG. 5. Subsequently, the recording/reproducing head is moved forward from the position 406 to a position 407 shown in FIG. 5 in a direction toward the outermost circumference to record the information 402. The recording/reproducing head then jumps from the position 407 to a position 408 shown in FIG. 5. Subsequently, the recording/reproducing head is moved forward from the position 408 shown in FIG. 5 in a direction toward the outermost circumference to record the information 403. That is, in order to record a piece of information, the recording/reproducing head needs to follow a track having a spiral shape and jumps from one track to another. Such an inter-track jump is required not only in a recording operation, but also in a reproducing operation.

When the-conventional information recording/reproducing method is applied to operations to continuously record and reproduce a large amount of information such as video information, the recording/reproducing head needs to be moved a number of times at a high speed due to the fact that recordable areas are scattered at different locations on the disc, increasing the load borne by the information recording/reproducing apparatus.

With the information recording/reproducing method provided by the present invention, on the other hand, a piece of information is always recorded in a contiguous area instead of scattered areas so that, by merely letting the recording/reproducing head follow a recording area with a track of spiral shape, information can be recorded and reproduced. It is not necessary to move the recording/reproducing head from one track to another. Thus, the information recording/reproducing method provided by the present invention is suited for operations to continuously record and reproduce a large amount of information such as video information.

Figure 6:
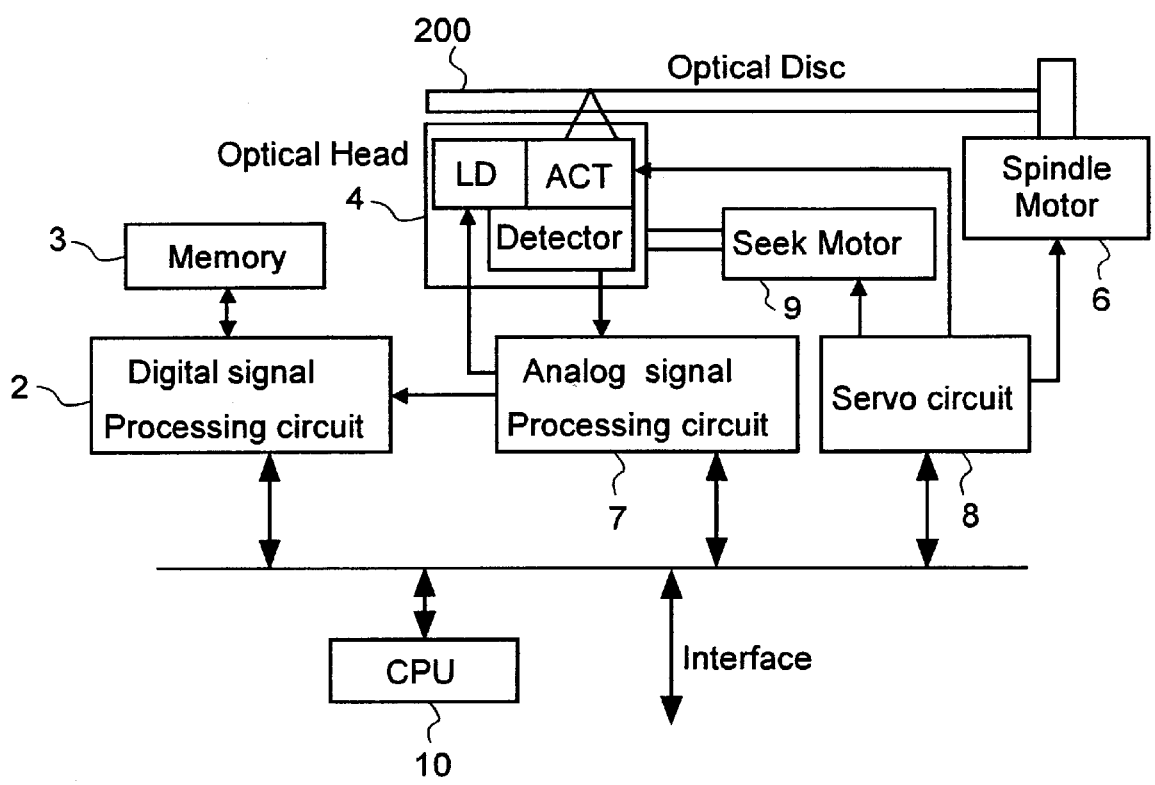
FIG. 6 is a block diagram of a recording/reproducing apparatus for an optical disc.

It should be noted that the information recording/reproducing method provided by the present invention is suited for the host or CPU of an information recording/reproducing apparatus employing a disc as a recording medium thereof and allows the conventional information recording/reproducing apparatus as shown in FIG. 6 for an optical disc recording medium 200 to be used as it is. In addition, the end of the innermost circumference of the spiral-line recording area on the disc is taken as a start address. It is worth noting, however, that the end of the outermost circumference can be taken as a start address to give the same effect. Moreover, even if the recording area on the disc has a shape of tracks of concentric circles, in operations to record and reproduce information, it is not necessary to move the recording/reproducing head by a long distance in the radial direction of the disc and at a high speed to give the same effect as operations to record and reproducing information onto and from a recording area having a track or tracks of spiral shape.

FIG. 6 shows in block diagram form an example of a recording/reproducing apparatus for an optical disc 200 including a digital processing circuit which translates data from an interface into a format enabling recording in the disc by encoding/decoding, modulating/demodulating, adding ECC (error correction code), etc. A memory 3 is provided for temporarily storing the data. The data is recorded in the optical disc and the data is reproduced by an optical head 4. The optical head 4 includes a recording unit having a laser diode (LD) and a reproducing unit having a detector, and an actuator (ACT) that enables tracking and focusing in order to record/reproduce information. The disc is rotated at high speed by a spindle motor 6 for enabling high speed recording/reproduction. This example relates to an optical recording method using phase change optical recording when the recording medium is a phase change recording film. However, optical recording mediums is other than a phase change recording thin film, such as a magneto-optical recording thin film using the kerr effect may also be utilized. A servo circuit 8 includes a spindle motor control unit which performs rotation control of the disc, actuator control which performs tracking and focusing control between the disc and optical head, and seek control which performs movement control of the optical head. The servo circuit and others such as an analog signal processing circuit 7 are controlled and managed by a CPU 10.

Reproduction is effected in the following manner. Laser light from the laser diode is irradiated on the disc 200, a reflection of the light is detected by a detector (data on the disc is detected as change of reflection light power), the signal is converted to digital data through the analog signal processing circuit 7 and digital signal processing circuit 2, and the data is transported to the CPU 10 and/or outside to an external unit, for example, by an interface unit.

The recording/reproducing speed of data is dependent on the rotation speed of a disc, and when the recording/reproducing is continuous and sequential, the transfer rate becomes more than 10 Mbps. But in case that data is recorded at plural random positions on an optical disc or data is to be recorded at plural random positions on an optical disc, it is necessary for the optical head to be moved by a seek motor to record or reproduce the data. However, as mentioned above, an optical head includes the recording unit, the reproduction unit, and a heavy actuator. Therefore, the seek time to move an optical head is ten times slower than that to move a magnetic head of magnetic hard disk system.

Figure 7:
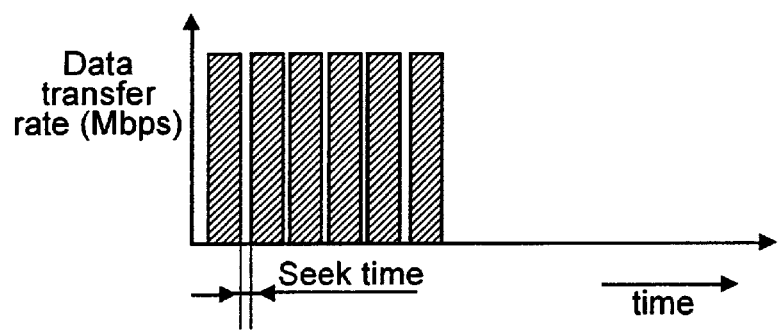
FIGS. 7(*a*) and 7(*b*) show differences in seek time for a magnetic head disc system and an optical disc system, respectively.
Figure 7:
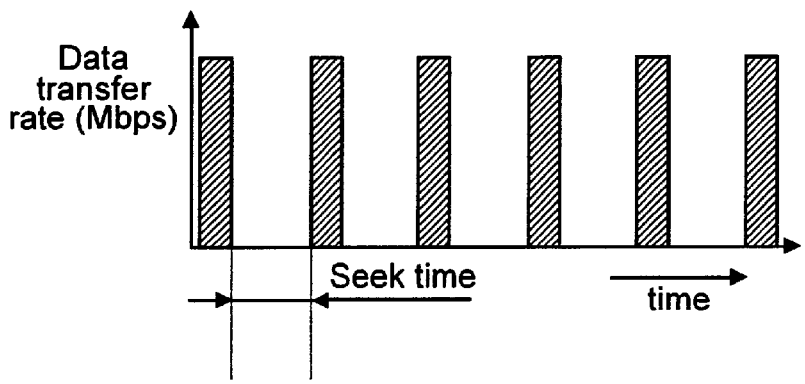

FIGS. 7(a) and 7(b) shows comparison of seek time for a magnetic hard disk and an optical disc to record at random or to reproduce data which are recorded at random. FIG. 7(a) shows the seek time for the magnetic hard disk system and FIG. 7(b) shows the seek time for the optical disc system. The ordinate indicates the data transfer rate (recording or reproduction rate) and the abscissa indicates the recording or reproduction time. Each of the patterns in FIGS. 7(a) and 7(b) represents recording or reproduction of one unit of information and the area of each pattern represents the capacity of each information unit. FIGS. 7(a) and 7(b) show the case where six independent information units of data which have the same capacity are recorded at any position and more than five seeks are necessary to record or reproduce the data. As is apparent by comparison of FIGS. 7(a) and 7(b), recording is completed faster for the magnetic hard disk system because of less seek time than for the optical disc system. A long seek time of the optical disc system does not cause serious problems under ordinary recording or reproduction of data such as computer data. However, when real time recording or reproduction of motion picture data or audio data is required, a long seek time cause delay of the recording or reproducing process and causes serious problems such as damage of data and interruption in viewing of the motion picture data or having the audio data, for example.

Figure 8:
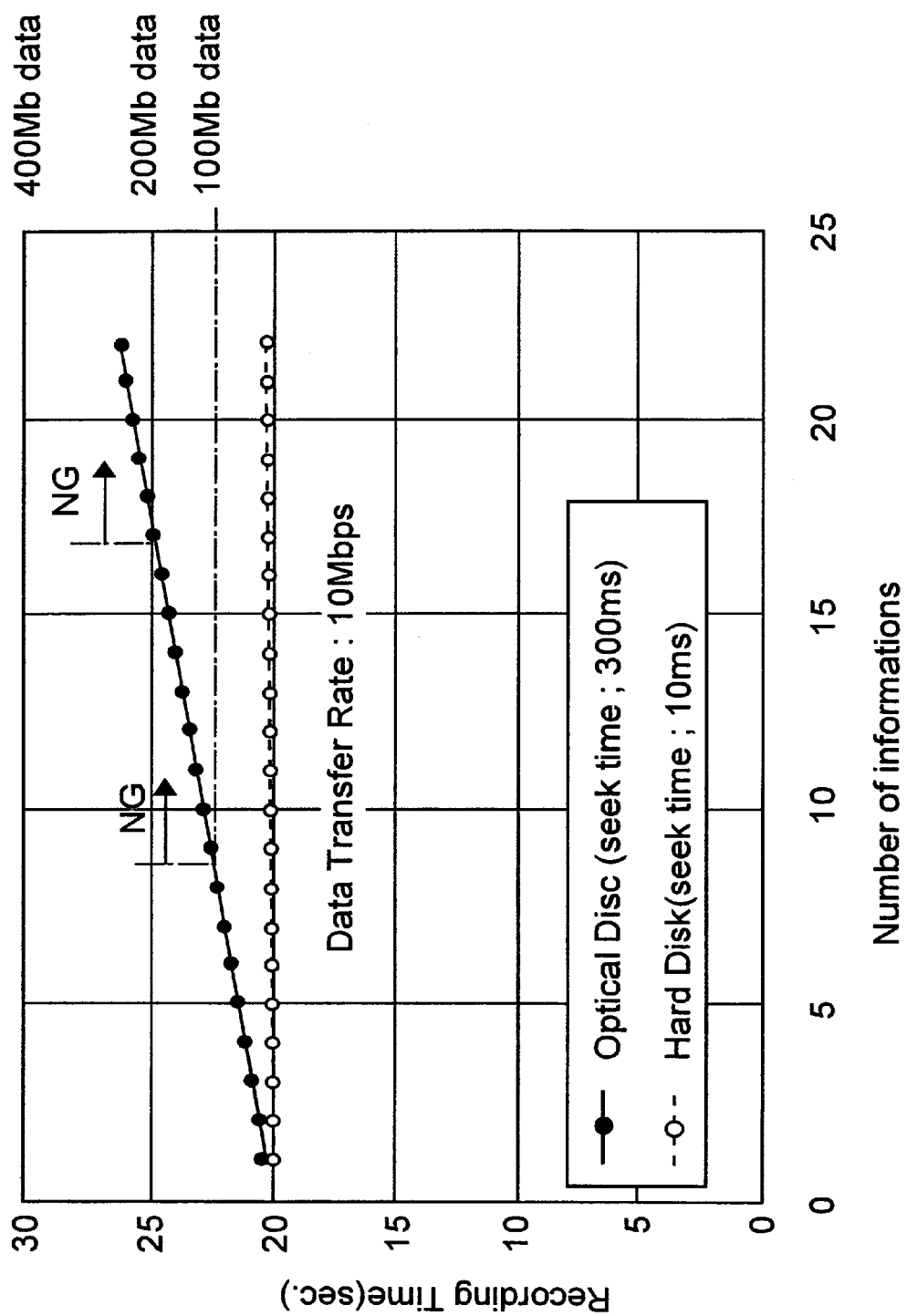
FIG. 8 shows curves for recording time in relation to the number of head seeks for a magnetic hard disc system and optical disc system.

FIG. 8 shows how many times of seek causes problems with data when recording or reproducing motion picture data under 10 Mbps (data transfer rate). One seek time of the magnetic hard disk system is 10 ms and that of the optical disc system is 300 ms. The ordinate indicates the recording and reproducing time and the abscissa indicates the seek times. As is apparent from FIG. 8, seek time does not have much effect on recording or reproducing time and does not cause damage of data for a magnetic hard disc system. To the contrary, for the optical disc system, data comes to have some damage when the seek exceeds nine times when data volume is 100 Mbps and which the seek time exceeds seventeen times for 200 Mbps of data volume.

Figure 9A:
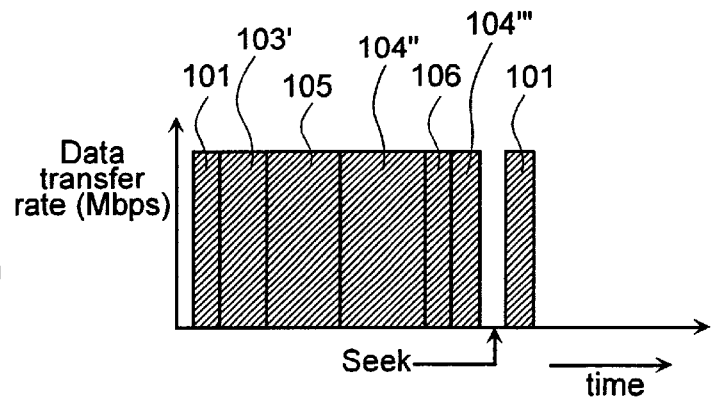
FIGS. 9(a)–(c) show time for recording/reproduction in accordance with the present invention (FIG. 9(a)) and two conventional methods or systems (FIGS. 9(b) and 9(c)).
Figure 9B:
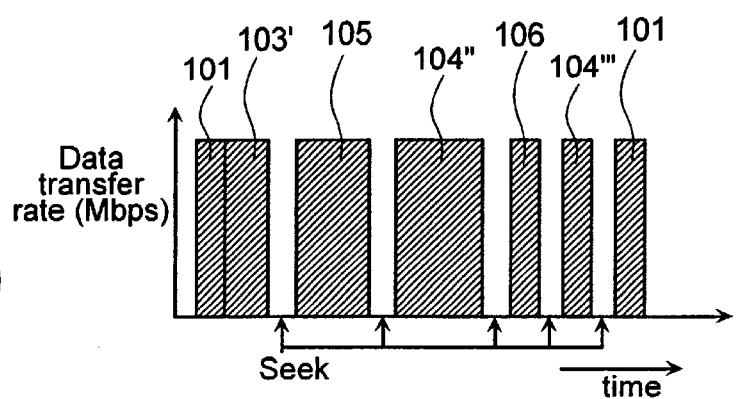
Figure 9C:
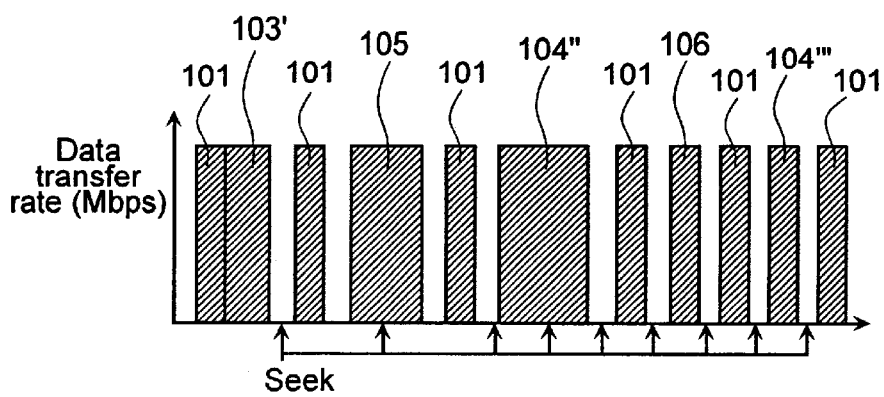

FIGS. 9(a) and 9(b) show the time (including seek time) to record or reproduce data as shown in FIG. 1(d) by a conventional method or system and by a method and system of the present invention. FIG. 9(a) represents the time in accordance with the present invention and FIGS. 9(b) and 9(c) represent the time for different conventional methods or systems. By the present invention, recording/reproduction time is very short and data does not become damaged because overwriting is allowed and there is no seek time among each information. However, by the conventional method as shown in FIG. 9(b) which does not allow overwriting, recording/reproduction is very long and data would become damaged under real time recording/reproduction because seeks are needed every time to access each information even if the control information 101 (including link information) is rewritten. Further, additional seek time is needed when the control information 101 is not rewritten as shown in FIG. 9(c) because access to the information 101 is needed to reproduce each information.

By adopting the information recording and reproducing method provided by the present invention in a system employing an information recording/reproducing apparatus using a disc as a recording medium thereof, new information can be overwritten on an area on the disc having information already recorded therein, allowing the new information to be added to or used as a replacement of the existing information without the need to carry out operations to delete, edit and relocate the existing information. In addition, with the information recording and reproducing method provided by the present invention, operations to record and reproduce information can be implemented without moving the recording/reproducing head mounted on the information recording/reproducing apparatus over a long distance and at a high speed.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. An information recording and control method for a recording medium, comprising the steps of:

overwriting at least a portion of previously recorded information in a recording area on a recording medium disc with new information;

cataloging information on said new information as control information on said recording medium disc;

treating residual information which is part of the previously recorded information which is not overwritten by said new information as new information; and cataloging information on said residual information which is treated as new information as control information on said recording medium disc.

2. An information recording and control method according to claim 1, wherein the step of overwriting with new information is effected without deleting the previous recorded information to be overwritten.

3. An information recording and control method according to claim 1, wherein the step of overwriting the new information is effected without reading out the previously recorded information and without effecting an editing operation to delete at least a portion of the previously recorded information in a recording area which is to be overwritten with the new information.

4. An information recording and control method according to claim 1, wherein the recording medium disc is an optical recording medium disc.

5. An information recording and control method according to claim 4, wherein the optical recording medium disc is a magneto-optical recording medium disc.

6. An information recording and control method according to claim 4, wherein the optical recording medium disc is a floppy optical recording medium disc.

7. An information recording and control method for a recording medium, comprising the steps of:

overwriting at least a portion of previously recorded information in a recording area on a recording medium disc with new information;

linking said new information to residual information which is a part of said previously recorded information which is not overwritten by said new information and is treated as new information; and cataloging information on said new linked information as control information on said recording medium disc.

8. An information recording and control method according to claim 7, wherein the step of overwriting with new information is effected without deleting the previous recorded information to be overwritten.

9. An information recording and control method according to claim 7, wherein the step of overwriting with new information is effected without reading out the previously recorded information and without effecting an editing operation to delete at least a portion of the previously recorded information in a recording area which is to be overwritten with the new information.

10. A rewritable disc recording medium comprising:

at least one track having information continuously recorded along a portion thereof with control information indicative of the recorded information at a portion of the at least one track, wherein a portion of the previously recorded information is overwritten with new information so that the new information is contiguous with the residual previously recorded information which is not overwritten, and wherein the control information is updated to designate the previously recorded residual information which is not overwritten as new information together with the new information.

11. A rewritable disc recording medium according to claim 10, wherein the rewritable disc recording medium is an optical recording medium disc.

12. A rewritable disc recording medium according to claim 11, wherein the optical recording medium disc is a magneto-optical recording medium disc.

13. A rewritable disc recording medium according to claim 11, wherein the optical recording medium disc is a floppy optical recording medium disc.

14. A rewritable disc recording medium according to claim 10, wherein the at least one track has a spiral shape.

15. A rewritable disc recording medium according to claim 10, wherein a plurality of tracks are recorded on the rewritable disc recording medium, the plurality of tracks being concentric tracks.

16. An information recording/reproducing apparatus for recording and reproducing information from a disc recording medium having information previously recorded in a recording area of the recording medium disc, said apparatus comprising:

means for overwriting new information into the recording area of the recording medium disc having previously recorded information thereon;

means for cataloging information on said new information as control information on said recording medium disc;

means for treating residual information which is part of the previously recorded information which is not overwritten by said new information as new information; and means for cataloging information on said residual information which is treated as new information as control information on said recording medium disc;

wherein movement of a recording/reproducing head of said information recording/reproducing apparatus for recording and reproducing information into and from said recording medium disc over a long distance is suppressed and a high speed operation to at least one of record and reproduce information is enabled.

17. An information recording/reproducing apparatus according to claim 16, wherein said recording medium disc is an optical recording medium disc.

18. An information recording/reproducing apparatus according to claim 16, wherein said means for overwriting effects overwriting without deleting the previously recorded information.

19. An information recording/reproducing apparatus according to claim 16, further comprising means for linking said new information to said residual information, and said means for cataloging catalogs said linked information as said control information.

* * * * *